United States Patent [19]

Kloevekorn et al.

[11] 4,329,687
[45] May 11, 1982

[54] RADAR RADIATING POLARIZED SIGNALS

[75] Inventors: Volker Kloevekorn, Gerlingen; Ullrich Raudonat, Schwieberdingen, both of Fed. Rep. of Germany

[73] Assignee: International Standard Electric Corporation, New York, N.Y.

[21] Appl. No.: 163,682

[22] Filed: Jun. 27, 1980

[30] Foreign Application Priority Data

Jun. 29, 1979 [DE] Fed. Rep. of Germany ....... 2926193

[51] Int. Cl.$^3$ .............................................. G01S 13/10
[52] U.S. Cl. ..................... 343/13 R; 343/100 CL; 343/100 PE
[58] Field of Search ......... 343/13 R, 100 PE, 100 CL

[56] References Cited

U.S. PATENT DOCUMENTS

| | | | |
|---|---|---|---|
| 2,619,635 | 11/1952 | Chait | 343/100 PE X |
| 3,732,565 | 2/1973 | Symaniec et al. | 343/100 CL X |
| 4,035,797 | 7/1977 | Nagy | 343/100 PE X |
| 4,107,678 | 8/1978 | Powell | 343/100 PE X |
| 4,117,488 | 9/1978 | Perrotti | 343/100 PE |

*Primary Examiner*—T. H. Tubbesing
*Attorney, Agent, or Firm*—W. T. O'Neil

[57] ABSTRACT

The radar radiates, alternately or according to a given code, left-hand and right-hand circularly or elliptically polarized signals. At the receiving end, the two orthogonal polarized components of the received signal are processed separately, and the phase shift between the two components is measured. It is determined whether this phase shift is similar to that existing at the instant of transmission between the two orthogonally polarized components which are mixed to produce the circularly or elliptically polarized signal. The similarity check is made by correlation.

A desired target is indicated if there is a given similarity. Coherent signal processing is not necessary (but possible).

7 Claims, 5 Drawing Figures

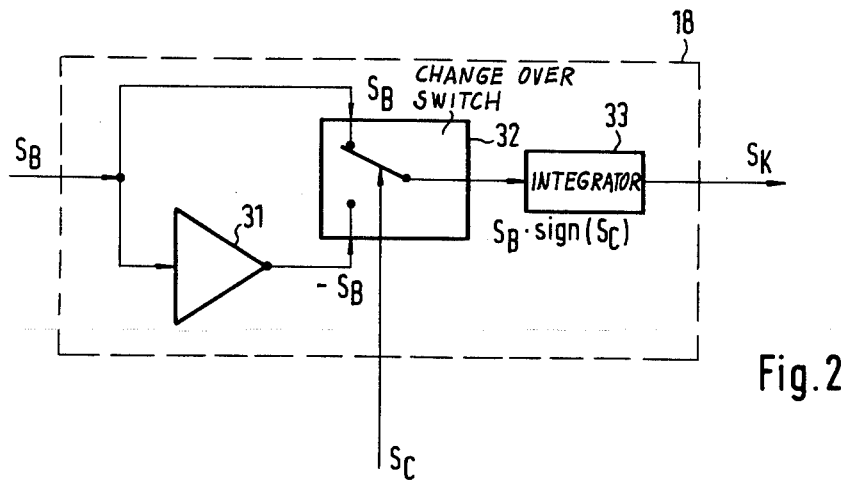
Fig.2
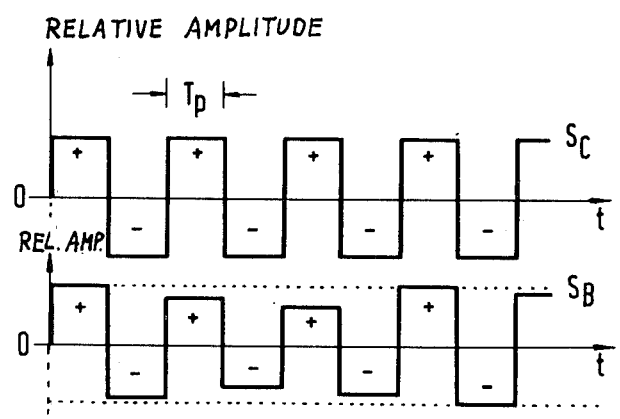
Fig.3a
Fig.3b
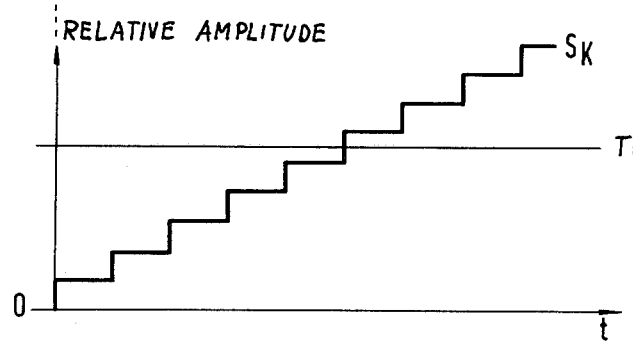
Fig.3c

RADAR RADIATING POLARIZED SIGNALS

BACKGROUND OF THE INVENTION

The present invention relates to a radar having polarization analysis capability. A radar of this kind is described in "IEEE Publication 77CH 1255-9 EASCON" (EASCON-77 Record) on page 16-6F.

That radar is an instrumentation system with which various measurements can be performed. Depending on the measurement to be made, selected ones of the many features of such an instrumentation radar may be utilized.

It is known that desired targets can be distinguished from clutter by evaluating the amplitude and phase information of the orthogonally polarized components of the received signal. How the evaluation can be carried out is not described.

A radar for detecting fixed targets (e.g. stationary vehicles) which alternately radiates vertically and horizontally polarized signals and senses the amplitude modulation of the received signals is described in the publication "A Millimeter Wave Radar for the Mini-RPV", AIAA/DARPA Conference on Smart Sensors, Hampton, Virginia, Nov. 14–16, 1978.

OBJECT

The object of the invention is to provide a radar which permits the detection of desired targets despite the presence of clutter.

ADVANTAGES

The amplitude of the received signal need not be evaluated. Since only the phase information of the received signal is used, amplitude fluctuations of the received signal, which are usually superimposed on the amplitude modulation, have no disturbing effect.

In the novel radar, both coherent and noncoherent signal processing can be performed. Since, however, the discrimination of desired targets (moving or fixed) from clutter requires no coherent signal processing, the transmitter/receiver portion of the radar set can be simple in design. Evaluation can be analog or digital.

By suitable choice of the code according to which switching between the different polarizations is effected during signal radiation, a favorable signal-to-clutter ratio is obtained.

BRIEF DESCRIPTION OF THE DRAWINGS

The invention will now be explained in more detail, by way of example, with reference to the accompanying drawings, in which according to the invention.

FIG. 2 shows a correlation device as used in the embodiment of FIG. 1; and

FIGS. 3a-3c show waveform timing diagrams to explain the operation of the radar.

DETAILED DESCRIPTION

Figure 1:
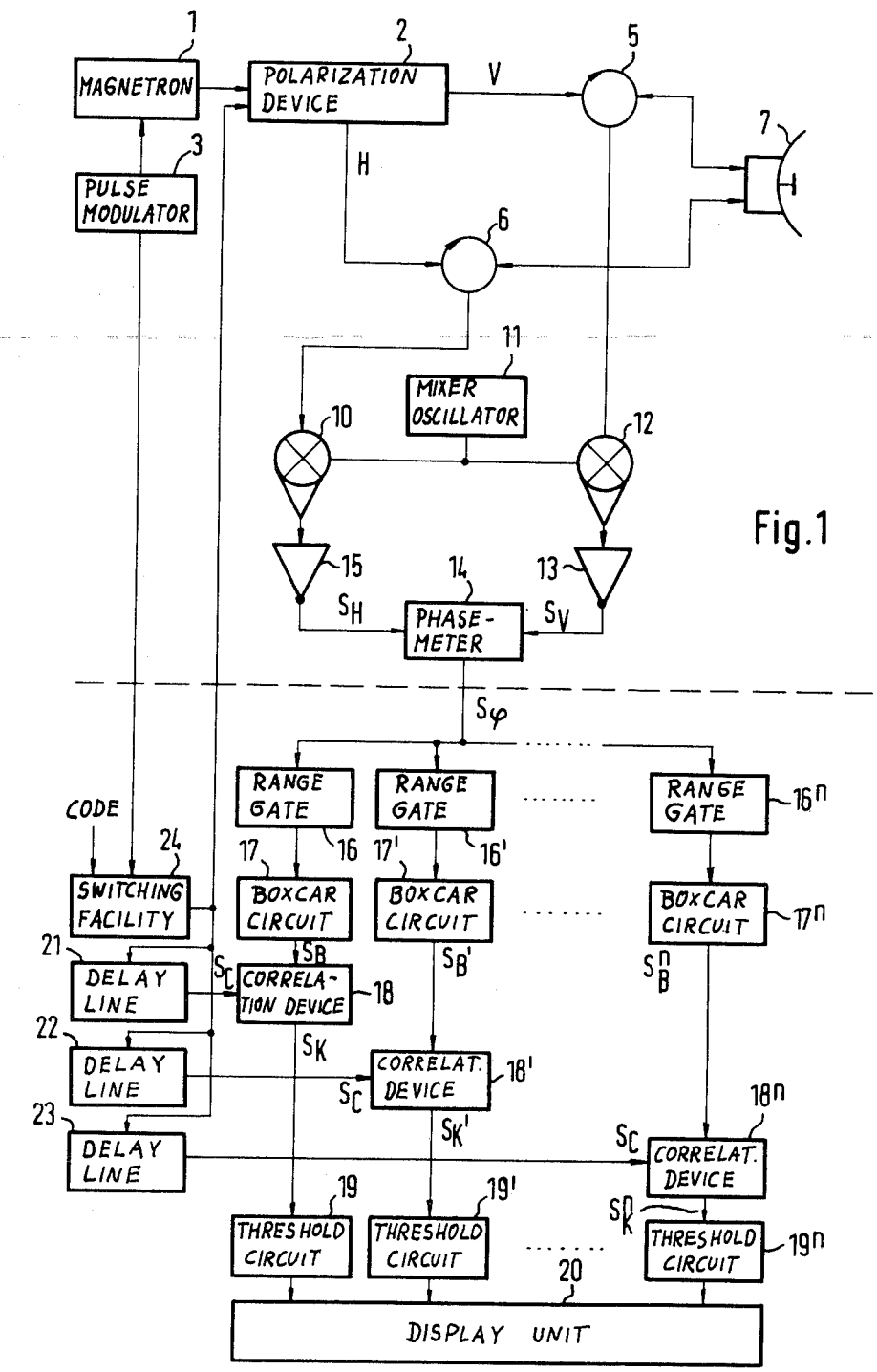
FIG. 1 is a block diagram of the radar.

In the embodiment described, the radar is assumed to be a pulse radar.

In FIG. 1, an RF wave generated in a magnetron 1 is modulated with pulses generated in a pulse modulator 3. The pulsed RF signal is applied to a polarization device 2, which provides a vertically polarized pulse train V and a horizontally polarized pulse train H. The two pulse trains V, H differ in phase by plus or minus 90° depending on the control of the polarization device 2 by a switching facility 24. The pulse trains V and H are applied through circulators 5 and 6, respectively, to a dual-mode antenna 7, where these two mutually orthogonally polarized pulse trains are heterodyned together, so that a circularly polarized pulse train is radiated.

The signals reflected from the targets are received by the antenna 7. The received elliptically or circularly polarized signals are split up into their vertically and horizontally polarized components. Both components are then processed in the same manner. They are applied through the circulators 5, 6 to mixers/preamplifiers 12, 10, which are also fed with a signal generated in a mixer oscillator 11. The intermediate-frequency signals generated are fed to amplifiers with limiter outputs 13, 15. The vertically polarized component is designated $S_V$, and the horizontally polarized component is designated $S_H$. A phasemeter 14 measures the phase difference between the signals $S_H$ and $S_V$.

The signal generation and processing (except for the control of the polarization device 2 by the switching facility 24), shown above the dashed line in FIG. 1, are described in the hereinbefore first-mentioned reference.

Moving targets can be distinguished from clutter by evaluating the Doppler shift of the received signals (with coherent signal processing). In the case of fixed targets, however, this is impossible. It has turned out, however, that fixed targets can be detected by using the differences in the reflection characteristics of desired targets and clutter sources with respect to polarization.

The novel radar radiates left-hand and right-hand circularly or elliptically polarized pulses in a predetermined sequence. To accomplish this, the switching facility 24 controls the polarization device 2 according to a predetermined code in such a way that the phase difference between the vertically and horizontally polarized components is plus or minus 90°, i.e., that—due to the mixing of the two components in the antenna—the antenna radiates left-hand or right-hand circularly polarized pulses. The code can be chosen so that successive pulses are alternately left-hand and right-hand circularly polarized.

To ensure that the switching is effected synchronously with the pulse radiation, the switching facility 24 is fed with control pulses from the pulse modulator 3. The output signal $S_C$ of the switching facility is a pulse train, which will be explained later.

For further evaluation, the output signal $S_\gamma$ of the phasemeter 14 is applied to a plurality of range gates 16, 16', 16$^n$, each of which is assigned to one range resolution cell and followed by a boxcar circuit 17, 17', 17$^n$. The boxcar circuits sample the output signals of the range gates and lengthen the sampled values so that pulses are produced whose length $T_p$ is equal to the time between two radiated radar pulses. Preferably, this length $T_p$ is also the length of the pulses provided by the switching facility 24.

Range gates and boxcar circuits as well as their operation are described in a book by M. I. Skolnik, "Introduction to Radar Systems", McGraw-Hill Book Company, New York, 1962, on pages 151, 152, and 168, so they need not be explained here.

The output signals $S_B$, $S_B'$, and $S_{Bn}$ of the boxcar circuits are applied to correlation devices 18, 18', 18$^n$, respectively. The correlation devices are also fed with the output signal $S_C$ of the switching facility 24. Before being applied to the correlation devices, this signal $S_C$ is delayed in delay lines 21, 22, 23 by $n\tau$ dependent upon range intervals, where n is the ordinal number of the respective range interval, an $\tau$ is the length of the radiated pulses. For the range interval next to the radar, $n=1$.

The output signals $S_K$, $S_K'$, and $S_{Kn}$ of the correlation devices are applied to threshold circuits 19, 19', and 19$^n$, respectively. When the threshold value is exceeded, a display unit 20 indicates the desired target in the respective range interval.

A typical implementation of a correlation device will now be explained in more detail with the aid of FIG. 2.

A correlation device 18 is to check the output signal $S_B$ of a boxcar circuit 17 and the output signal $S_C$ of the switching facility 24 for similarity. This requires that the complete crosscorrelation function of $S_C$ and $S_B$ be formed. The correlator must only determine the value of the correlation function for zero time shift.

The output signal $S_B$ of a boxcar circuit is applied directly and through an inverter 31 to a change-over switch 32, which is controlled by the output signal $S_C$ of the switching facility 24. $S_B$ is transferred to an integrator 33 unchanged for positive values of $S_C$, and as an inverted signal $-S_B$ for negative values of $S_C$. The integrator performs integration over several pulse periods. If the signals $S_B$ and $S_C$ are similar, i.e., if they have the same sign in each period, the output of the change-over switch provides a positive product of $S_B$ and the sign of $S_C$. In this case, the value of the integrated signal $S_K$ increases steadily up to the maximum value of the crosscorrelation function for zero time shift.

Referring now to FIG. 3, the signal $S_C$ (FIG. 3a) of the switching facility 24 consists of a sequence of positive and negative pulses. Positive and negative pulses indicate that the horizontally and vertically polarized signals provided by the polarization device 2 differ in phase by plus and minus 90°, respectively. In the example shown, this sequence is alternating, and, consequently, the radiated radar pulses are alternately left-hand and right-hand circularly polarized.

As mentioned earlier, a desired target hardly influences the existing polarization during reflection. The signal received by the radar thus has the same polarization as the radiated signal, i.e., the phasemeter 14 measures between the vertical and horizontal components a phase difference which is equal to that between the two components on the antenna at the instant of transmission.

The amplitude (allowing for the sign) of the output signal $S_B$ (FIG. 3b) of a boxcar circuit is a measure of this phase difference. If the phase differences between the two orthogonal components of the radiated signal and the received signal agree, the received signal was reflected from a desired target. However, a single comparison is very unreliable. Therefore, several comparisons are made. This is implemented by the correlation described. If the integrated signal $S_K$ exceeds an amplitude threshold value after a predetermined number of cycles, a desired target is displayed (FIG. 3c). This method of evaluation gives a good signal-to-clutter ratio.

It is also possible to radiate amplitude-modulated CW signals instead of radar pulses. What was said for pulses applies analogously. The period of the modulating signal corresponds to the pulse separation.

Signal evaluation can be analog or digital.

We claim:

1. A radar system for discriminating among targets on the basis of echo polarization characteristics, comprising:
    transmitting means for radiating elliptically polarized signals switched between left and right hand sense according to a predetermined pattern;
    said transmitting means including an antenna having two orthogonal radiating modes and means for generating a pair of mutually orthogonally phased RF signals exciting said antenna to radiate elliptically polarized waves;
    receiving means responsive to echo signals from targets illuminated by said transmitting means, said receiving means separating said echo signals into first and second components having a mutual phase difference therebetween as a function of their relative polarization angle in said echo signals;
    and means for evaluating said phase shift extant between said first and second echo signal components compared to that of said pair of RF signals generated in said transmitted means to provide a signal indicative of polarization correspondence.

2. A system according to claim 1 in which said means for generating a pair of mutually orthogonally phased RF signals comprises means for generating said signals to excite said antenna for radiation in circular polarization.

3. A system according to claim 1 in which said transmitting means includes means for polarization switching of said radiated signals between said right hand sense and said left hand sense alternately.

4. A system according to claim 3 in which radar system is further defined as a pulsed radar system, said right and left hand radiated polarization being alternated between successive transmitted pulses.

5. A system according to claim 1 including a series of signal processing channels responsive to said receiving means and within said phase shift evaluating means, said channels each corresponding to a range resolution cell within the time following each transmitted pulse and further including;
    a discrete correlation device within each of said signal processing channels responsive to a signal from said transmitting means indicative of transmitted polarization sense and to a signal of the corresponding range resolution cell to produce a train of pulses each pulse of which has a value indicative of relative polarization correspondence in the particular corresponding range resolution cell, and a threshold circuit discretely responsive to the output of each of said correlation devices for providing an output whenever a received signal having a predetermined polarization characteristic is extant within a corresponding range resolution cell.

6. A system according to claim 5 including a range gate circuit followed by a discrete boxcar circuit within each of said signal processing channels preceding said correlation device.

7. A system according to claim 6 in which said correlation devices include integration means whereby signal amplitude into said threshold circuits is representative of more than one successive received pulse of said received signal within the corresponding range gate.

* * * * *